United States Patent Office 3,181,506
Patented May 4, 1965

3,181,506
FEEDING METHOD
Shaun A. Seymour, Ephrata, Pa., assignor to Sperry Rand Corporation, New Holland, Pa., a corporation of Delaware
No Drawing. Filed Jan. 17, 1964, Ser. No. 338,308
1 Claim. (Cl. 119—56)

This invention relates to a method for feeding stock animals such as hogs.

A system for feeding stock animals known as multiple-limited-feeding is gaining in popularity in the United States. Under such system, animals are fed more frequently than as commonly employed and the total amount of feed provided each day is less than the quantity the animals could consume. The animals are maintained in a moderately hungry condition so that when a particular feeding occurs, the animals will eat all of the feed made available to them. The wasting of feed is eliminated and the animals achieve a desired weight gain with less feed. The production cost of each pound of meat is therefore lower and the animal raiser makes a higher profit.

When animals are fed on a multiple-limited-feed basis, it is important that all animals receive their feed at the same time. Otherwise, the aimals will crowd and push to have first access to the feed when it is made available. The feeders shown in U.S. Patents Nos. 3,026,845 and 2,940,639 are so constructed and operative that after a quantity of feed has been withdrawn from a supply hopper, and distributed throughout the length of a feed container, the material will be deposited simultaneously along the length of a feeding station so that all animals will have feed made available to them at the same time.

One problem with multiple limited feeding, particularly with hogs, is that when a feeding time arrives, the animals become anxious for feed. When the mechanical feeder starts operating, the animals learn that a feeding will take place. If they are very hungry, the hogs often become riotously excited waiting for the feed conveyor to complete the distribution of feed and for the discharge of the feed to occur. This excitement of the animals disturbs the tranquility of the feed lot, adversely affects the metabolism of the animals and reduces their digestive efficiency.

A main object of this invention is to provide a method of feeding stock animals which greatly reduces animal excitement at the beginning of the feeding operation.

Another object of this invention is to provide a method for feeding stock animals wherein, during a feeding operation, the first thing that happens is that feed is dumped, the withdrawing of feed from a supply source and the distribution of such feed taking place after an initial amount of feed has been made available to the animals.

Other objects of this invention will be apparent hereinafter from the specification and from the recital in the appended claim.

According to the method of this invention, feed is withdrawn from a supply hopper or other source and uniformly distributed throughout the length of an elongated horizontally extending feed container located above a feeding station where the animals are to feed. The conveying and distribution of the feed may be by any conveyor such as an auger. After the feed has been withdrawn and distributed, it is dumped simultaneously along the length of the container so that all of the animals along the feed station receive feed at the same time and have an equal opportunity to feed.

The withdrawal, distribution and dumping of feed is continued until a desired total amount of feed has been deposited for the animals. Then, while the animals are eating, a final amount of feed is withdrawn from the supply source and distributed along the length of the container. However, the operation is stopped before the feed is dumped so that a distributed charge of feed will be held in readiness for the next feeding time for the animals. When such next feeding time arrives, the first thing that will happen is that feed will be immediately deposited. In this way, the animals may begin to feed from this initial deposit while additional amounts of feed are brought to them.

The mechanism employed for achieving the described method may be according to either of the cited patents or other similar devices. In Patent No. 3,026,845 the feed is deposited by dropping a bottom gate on a container. In Patent No. 2,940,639 feed is deposited by rotating a tube which is slotted. Using the same devices as disclosed in the patents, but merely changing the switching arrangement so that a feeding operation ends with the containers supplied with feed is all that is required. For example, the pressure switches employed in the patents for instituting the dumping of the feed can be utilized to cease the operation of the feeder after a given number of dumping cycles. Thereafter, any suitable type of timer mechanism can be used to begin the operation of each mechanism.

In practicing the method of this invention, a quantity of feed is always maintained in readiness above the feeding station where the animals feed. When a feeding time arrives, the first thing to happen is that feed is discharged. Thereafter, the feeder mechanism can operate in a conventional manner as shown in the patents to successively fill and dump feed for the feeding station but terminating in a condition where a supply of feed is held in readiness for the next feeding operation.

When an open, dump tube mechanism is employed, the disclosed method is intended to be practiced in indoor feeding arrangements or outdoor feeding stations provided with a roofed structure.

While this invention has been described in connection with a particular embodiment thereof, it will be understood that it is capable of modification, and this application is intended to cover any variations, uses, or adaptations following, in general, the principle of the invention and including such departures from the present disclosure as come within known or customary practice in the art to which the invention pertains, and as fall within the scope of the invention or the limits of the appended claim.

Having thus described my invention what I claim is:

A method for feeding stock animals such as hogs, comprising withdrawing feed from a supply source and generally uniformly distributing the feed throughout the length of an elongated horizontally extending container located above a station where the animals are to feed, then after the withdrawn feed has been distributed, dumping it simultaeously along the length of the feed station so that the animals along the station all have feed deposited for them at the same time, then repeating the distribution and dumping cycles until a desired total amount of feed has been deposited for the animals, and then, while the animals are eating, distributing a given amount of feed along the length of the container and before the feed is dumped stopping the operation so that a distributed charge of feed will be held in readiness for the next feeding of the animals, whereby when the next feeding takes place it will begin with the dumping of feed simultaneously along the length of the feeder and the animals will not have to wait for a feed distribution to take place.

References Cited by the Examiner

UNITED STATES PATENTS

| | | | |
|---|---|---|---|
| 983,919 | 2/11 | McGuigan | 119—51.11 |
| 3,051,294 | 8/62 | Reed | 198—65 |
| 3,119,526 | 1/64 | Sutton | 222—56 |
| 3,123,050 | 3/64 | Haen | 119—52 |
| 3,139,862 | 7/64 | Rutten et al. | 119—56 |
| 3,155,286 | 11/64 | Van Peursey | 222—166 |

SAMUEL KOREN, *Primary Examiner.*

ALDRICH F. MEDBERY, *Examiner.*